(12) United States Patent
Cui et al.

(10) Patent No.: US 10,019,955 B2
(45) Date of Patent: *Jul. 10, 2018

(54) ARRAY SUBSTRATE, DISPLAY PANEL AND DISPLAY DEVICE (71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Ziwei Cui, Beijing (CN); Hongjun Yu, Beijing (CN); Hong Zhu, Beijing (CN); Hao Wu, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 140 days.

This patent is subject to a terminal disclaimer.

(21) Appl. No.: 14/568,998

(22) Filed: Dec. 12, 2014

(65) Prior Publication Data
US 2016/0063937 A1 Mar. 3, 2016

(30) Foreign Application Priority Data
Aug. 28, 2014 (CN) .......................... 2014 1 0431493

(51) Int. Cl.
G09G 3/36 (2006.01)
G09G 3/00 (2006.01)
G02F 1/1362 (2006.01)

(52) U.S. Cl.
CPC ........... G09G 3/3648 (2013.01); G09G 3/006 (2013.01); *G02F 2001/136254* (2013.01); *G09G 2330/12* (2013.01)

(58) Field of Classification Search
None
See application file for complete search history.

(56) References Cited

U.S. PATENT DOCUMENTS 6,297,080 B1 * 10/2001 Lee ........................ G02F 1/1368
257/55
7,400,365 B2 * 7/2008 Gotoh ................... G02F 1/1368
257/59

(Continued)

FOREIGN PATENT DOCUMENTS

CN 102540600 A 7/2012
CN 102944959 A 2/2013
(Continued)

OTHER PUBLICATIONS

1st office action issued in Chinese application No. 201410431493.4 dated Jun. 27, 2016.

*Primary Examiner* — Paresh Patel
(74) *Attorney, Agent, or Firm* — Nath, Goldberg & Meyer; Joshua B. Goldberg (57) ABSTRACT

The invention discloses an array substrate, a display panel and a display device, and belongs to the field of array substrate test technology, which can solve the problem that the performance of the thin film transistor at the display region of the array substrate in an ADS mode cannot be accurately tested. The array substrate in the invention comprises a plurality of pixel units, each of which comprises a pixel electrode, an insulating layer above the pixel electrode, and a common electrode above the insulating layer, wherein at least one of the pixel units is a test pixel unit, wherein an opening is provided in the insulating layer of the test pixel unit to be above the pixel electrode and separated from the common electrode. The display panel and the display device in the invention comprise the above array substrate.

17 Claims, 5 Drawing Sheets

(56) References Cited

U.S. PATENT DOCUMENTS

| | | | | |
|---|---|---|---|---|
| 7,439,544 B2* | 10/2008 | Lin | ................... | H01L 27/14658 257/296 |
| 7,524,711 B2* | 4/2009 | Lan | ................... | H01L 27/14603 438/155 |
| 7,902,513 B2* | 3/2011 | Kub | ......................... | G01T 3/08 250/370.05 |
| 8,791,419 B2* | 7/2014 | Chang | ............... | H01L 27/14603 250/370.01 |
| 8,928,826 B2* | 1/2015 | Zhang | ................. | G02F 1/1309 349/40 |
| 8,976,310 B2* | 3/2015 | Won | ...................... | G02F 1/1368 257/48 |
| 2002/0051114 A1 | 5/2002 | Kwak et al. | | |
| 2004/0124869 A1* | 7/2004 | Lee | ....................... | G02F 1/1345 324/750.3 |
| 2015/0162251 A1* | 6/2015 | Jeong | ..................... | H01L 27/124 257/48 |
| 2015/0170981 A1* | 6/2015 | Liao | ........................ | H01L 22/32 257/48 |
| 2015/0200145 A1* | 7/2015 | Yoo | ........................ | H01L 22/32 349/42 |
| 2015/0253635 A1* | 9/2015 | Ding | ..................... | H01L 27/124 349/143 |
| 2016/0187732 A1* | 6/2016 | Zhao | ..................... | G02F 1/1362 257/48 |

FOREIGN PATENT DOCUMENTS

| | | |
|---|---|---|
| CN | 103217840 A | 7/2013 |
| CN | 103700671 A | 4/2014 |
| JP | 2008-15367 A | 1/2008 |

* cited by examiner

ARRAY SUBSTRATE, DISPLAY PANEL AND DISPLAY DEVICE

TECHNICAL FIELD

The present invention relates to the field of array substrate test technology, and particularly to an array substrate, a display panel and a display device.

BACKGROUND ART

A liquid crystal display device in an Advanced Super Dimension Switch (ADS) mode has been widely used due to its advantages such as high aperture ratio and wide view angle.

Figure 1:
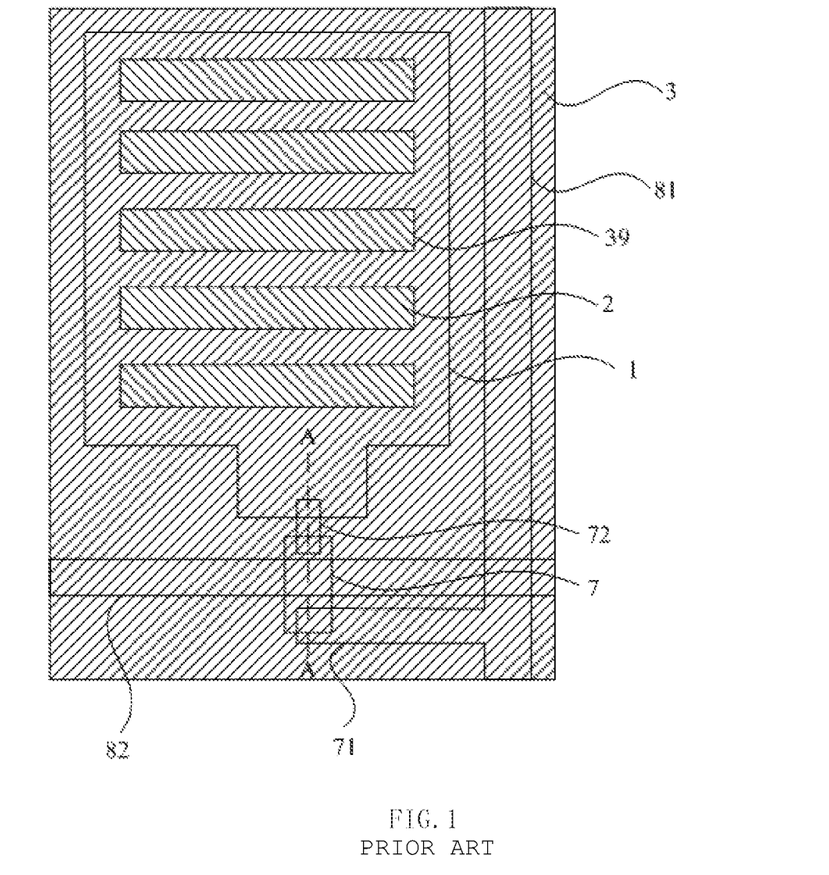
FIG. 1 is a perspective diagram illustrating a top view of a structure of a pixel unit of an array substrate in the prior art.
Figure 2:
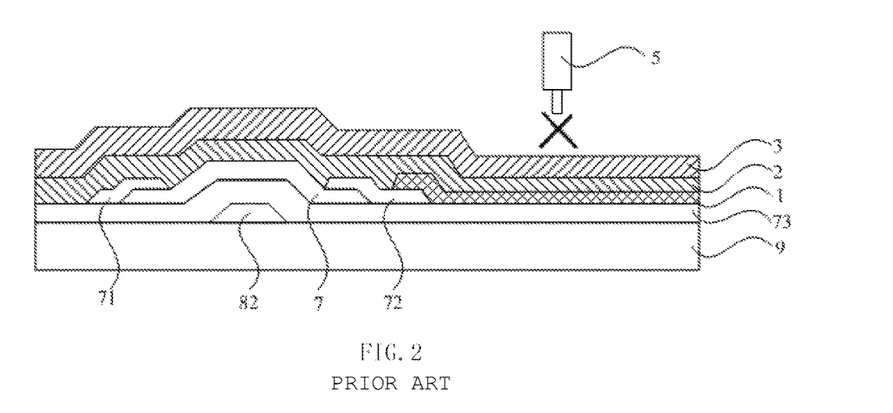
FIG. 2 is a cross-sectional view of the pixel unit in FIG. 1 taken along line AA.

As shown in FIG. 1 and FIG. 2, an existing array substrate in an ADS mode comprises a base 9, and known structures such as data lines 81, gate lines 82, thin film transistors (each of which comprises an active region 7, a source 71, a drain 72, a gate, and a gate insulating layer 73) are provided on the base 9. The drain 72 of the thin film transistor is connected to the pixel electrode 1, an insulating layer 2 (PVX) is provided above the pixel electrode 1, and a common electrode 3 with slits 39 is provided above the insulating layer 2. It can be seen from above that, the performance of the thin film transistor of its own has a significant effect on a voltage of the pixel electrode (i.e., display effect). Therefore, it is necessary to test the performance of the thin film transistor before the array substrate is shipped. In an existing test method, a test pin 5 is in contact with the pixel electrode 1, and a test signal is inputted to the data line 81 and the gate line 82, so that currents in the thin film transistor under various gate voltages can be tested using the test pin 5.

As shown in FIG. 2, in the above array substrate, the pixel electrode 1 is provided with an insulating layer 2 (and further parts of the common electrode excluding the slits 39) thereabove, therefore, it is impossible for the test pin 5 to come into contact with the pixel electrode 1, and thus thin film transistors in the respective pixel units cannot be tested directly. Therefore, it is necessary to additionally provide test thin film transistors in edge regions other than the display region (which is a region for displaying in the center of the array substrate), wherein the test thin film transistors are manufactured in synchronization with the thin film transistors in the display region, but are not connected to other structures such as the pixel electrode 1 and are specially used to test.

Figure 3:
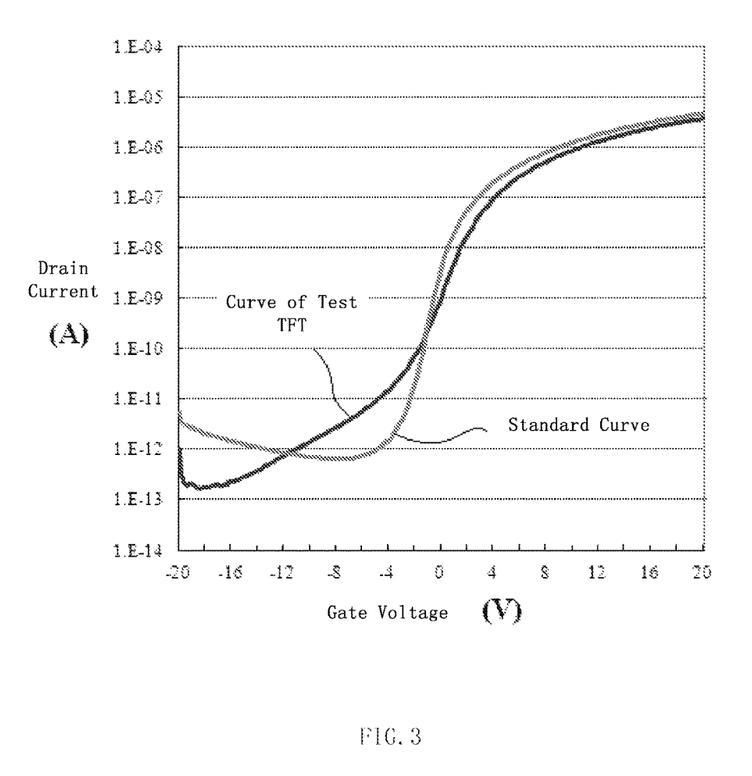
FIG. 3 is a diagram illustrating a test result of performance of the thin film transistor.

The inventor finds at least following problems existing in the related art:

The edge region and the display region of the array substrate are different in structure, for example, there is no electrode provided in the edge region, and during manufacturing the array substrate, the display region is protected in many procedures, in contrast, no protection measure is taken for the edge region. In summary, the test thin film transistor is subjected to a different process environment from the thin film transistors in the display region, and such a difference will affect the performance of the thin film transistor. Therefore, the performance of the test thin film transistor is not necessarily the same as that of the thin film transistor in the display region, and thus the performance of the thin film transistor in the display region cannot be accurately determined depending on the performance of the test thin film transistor. For example, among the performance test curves shown in FIG. 3, the curve of the test thin film transistor is not coincided with the standard curve, which represents that the performance of the test thin film transistor is unqualified, however, it can not be determined whether or not the performance of the thin film transistor at the display region is also unqualified as the test thin film transistor, therefore, the test result is not accurate and just only used as a reference.

SUMMARY

An object of the invention is to provide an array substrate, a display panel and a display device, the thin film transistor of which can be accurately tested, so as to solve the problem that the performance of the thin film transistor in the display region of the existing array substrate in an ADS mode cannot be accurately tested.

A solution for solving the above problem is an array substrate, which comprises a plurality of pixel units, each of which comprises a pixel electrode, an insulating layer above the pixel electrode, and a common electrode above the insulating layer, wherein at least one of the pixel units is a test pixel unit, wherein an opening is provided in the insulating layer of the test pixel unit to be above the pixel electrode and separated from the common electrode.

Preferably, a common opening is provided in the common electrode, and the common opening coincides with the opening in the insulating layer or goes beyond the opening in the insulating layer.

Preferably, the test pixel unit comprises a conductive pin contacting structure which is above the insulating layer and separated from the common electrode, wherein the pin contacting structure is connected to the pixel electrode through the opening in the insulating layer.

Further preferably, the pin contacting structure and the common electrode are formed simultaneously.

Further preferably, the pixel unit comprises a light-outputting region for displaying and a light-blocking region at the periphery of the light-outputting region, and wherein the pin contacting structure is located at the light-blocking region.

Preferably, the pixel unit comprises a light-outputting region for displaying and a light-blocking region at the periphery of the light-outputting region, and wherein the opening in the insulating layer is located at the light-blocking region.

Preferably, the number of the test pixel units is more than one, and the test pixel units are uniformly distributed on the array substrate.

Further preferably, the number of the test pixel units is from 2 to 20.

A solution for solving the above problem is a display panel comprising the above array substrate.

A solution for solving the above problem is a display device comprising the above display panel.

In the array substrate of the invention, the insulating layer is provided with an opening above the pixel electrode, and the opening is separated from the common electrode, therefore, neither the common electrode nor the insulating layer is provided at a position above the pixel electrode corresponding to the opening, and thus the signal of the pixel electrode can be led out via the opening by the test pin so that the thin film transistor can be tested, hence performances of transistors in the display region can be tested accurately.

Reference Signs:

1-pixel electrode; 2-insulating layer; 21-opening; 3-common electrode; 31-ring groove; 32-common opening; 39-slit; 4-pin contacting structure; 5-test pin; 7-active region; 71-source; 72-drain; 73-gate insulating layer; 81-gate line; 82-data line; and 9-base.

DETAILED DESCRIPTION OF THE EMBODIMENTS

In order to make a person skilled in the art understand the solutions of the invention better, the invention will be described in detail below in conjunction with the drawings and embodiments.

First Embodiment:

The embodiment provides an array substrate, which comprises a plurality of pixel units, each of which comprises a pixel electrode, an insulating layer above the pixel electrode, and a common electrode above the insulating layer, wherein at least one of the pixel units is a test pixel unit, wherein an opening is provided in the insulating layer of the test pixel unit to be above the pixel electrode and separated from the common electrode.

In the array substrate of the invention, the insulating layer is provided with an opening above the pixel electrode, and the opening is separated from the common electrode, therefore, neither the common electrode nor the insulating layer is provided at a position above the pixel electrode corresponding to the opening, and thus the signal of the pixel electrode can be led out via the opening by the test pin so that the thin film transistor can be tested, hence performances of transistors in the display region can be tested accurately.

Figure 4:
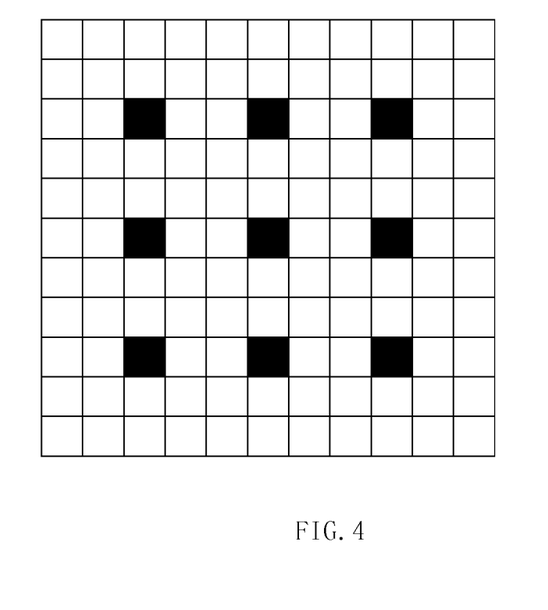
FIG. 4 is a diagram illustrating the distribution of the test pixel units in the array substrate according to a first embodiment in the invention.
Figure 5:
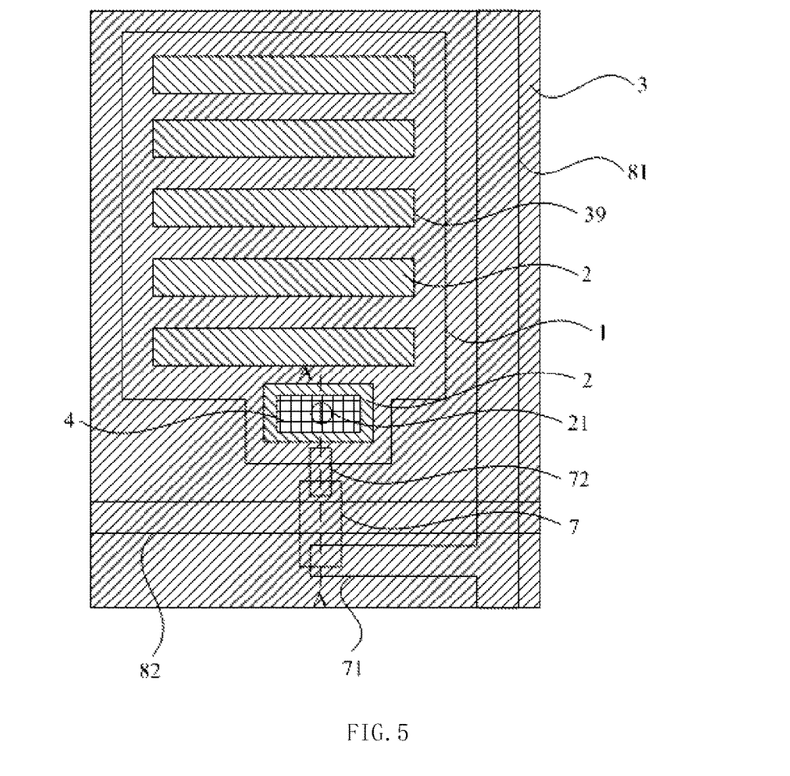
FIG. 5 is a perspective diagram illustrating a top view of a structure of a test pixel unit of an array substrate according to the embodiment in the invention.
Figure 6:
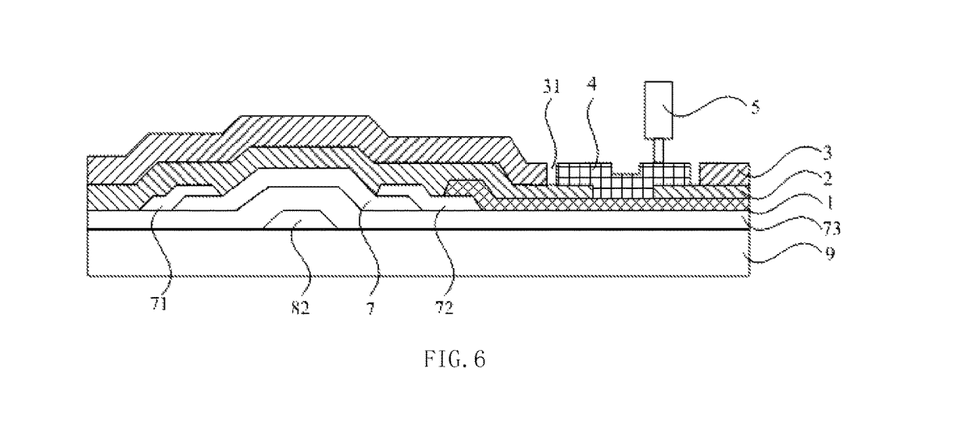
FIG. 6 is a cross-sectional view of the pixel unit in FIG. 5 taken along line AA.

Second Embodiment:

As shown in FIG. 4 to FIG. 6, the embodiment provides an array substrate, which is an array substrate in an ADS mode.

The array substrate comprises a base 9, which is provided with data lines 81 and gate lines 82, which are insulated from each other and arranged crosswise, thereon, and the data lines 81 and gate lines 82 defines pixel units at crossing points therebetween, respectively, each of the pixel units corresponds to a "sub pixel" in the display panel, that is, the pixel unit is a "point" for displaying separately.

Each pixel unit comprises a thin film transistor, and the thin film transistor comprises an active region 7, a source 71, a drain 72, a gate, and a gate insulating layer 73, wherein the gate insulating layer 73 is provided between the active region 7 and the gate, the gate is electrically connected to the gate line 82 (or the gate line 82 may be directly used as the gate), the source 71 is connected to the data line 81, and the drain 72 is connected to the pixel electrode 1. An insulating layer 2 is provided above the pixel electrode 1, a common electrode 3 is provided above the insulating layer 2, and the common electrode 3 is provided with a plurality of slits therein corresponding to the pixel electrode 1, so that an electric field for driving the liquid crystal may be generated above the slits 39.

In the array substrate, at least one pixel unit functions as a "test pixel unit", the pixel electrode 1 of which may be in contact with a test pin 5, so that performance of the thin film transistor in the test pixel unit may be tested.

FIG. 4 shows the distribution of the pixel units in the array substrate, wherein each small square represents a pixel unit, and the black small square represents a test pixel unit. Preferably, as shown in FIG. 4, in the entire array substrate, there are a plurality of test pixel units, and these test pixel units are uniformly distributed in the array substrate.

Further preferably, the number of the test pixel units is 2 to 20, for example, 6, 9 or 15.

The reason for providing a plurality of test pixel units is in that, as performances of the thin film transistors at various positions in the array substrate may be different, it is preferable to provide test pixel units at various positions so as to test more thin film transistors. Meanwhile, the test pixel unit may be different from the general pixel unit in display effect, and therefore, in order to avoid the influence on the overall display effect of much more test pixel units, the number of the test pixel units cannot be too large, and the number in the above range is preferable. Specifically, the structure of the test pixel unit will be described in detail below.

As shown in FIG. 5 and FIG. 6, in the insulating layer 2 of the test pixel unit, there is provided an opening 21 which is above the pixel electrode 1 and separated from the common electrode 3. Meanwhile, the pixel unit also comprises a pin contacting structure above the insulating layer 2, wherein the pin contacting structure 4 is conductive and separated from the common electrode 3, and wherein the pin contacting structure 4 is connected to the pixel electrode 1 through the opening 21 in the insulating layer 2.

That is, in the test pixel unit, the insulating layer 2 is not integrated and has an opening above the pixel electrode 1, and the opening 21 is separated from the common electrode 3, that is, the common electrode 3 is not provided at the opening 21. Meanwhile, the pin contacting structure 4 made of a conductive material is formed on the insulating layer 2, the pin contacting structure 4 is not in contact with the common electrode 3 either, and the pin contacting structure 4 covers the opening 21 in the insulating layer 2 so as to be in contact with the pixel electrode 1.

It can seen from FIG. 6 that, neither the insulating layer 2 nor the common electrode 3 is provided at the opening 21 above the pixel electrode 1, and the pixel electrode 1 is in contact with the pin contacting structure 4, so that the signal from the pixel electrode 1 may be conducted to the pin contacting structure 4 through the opening 21. Therefore, when the test pin 5 comes into contact with the pin contacting structure 4, the signal from the pixel electrode 1 (that is, the signal from the drain 72 of the test thin film transistor) may be collected through the test pin 5. As such, for an array substrate in an ADS mode, the performance of the thin film transistor in the display region can be test directly, so that the reliability and accuracy of the test result can be secured.

Preferably, the pin contacting structure 4 and the common electrode 3 are formed simultaneously.

That is to say, the pin contacting structure 4 and the common electrode 3 are preferably formed in a single patterning process and by using the same transparent conductive material layer (for example, Indium tin oxide layer). Specifically, the pattern of the general common electrode 3 may be changed, and a ring groove 31 may be additionally provided around the opening 21, so that the transparent conductive material layer inside the ring groove 31 may form the pin contacting structure 4, and the transparent conductive material layer outside the ring groove 31 may still form the common electrode 3, that is, the pin contacting structure 4 and the common electrode 3 are separated from each other by the ring groove 31.

Simultaneously forming the pin contacting structure 4 and the common electrode 3 may simplify the manufacturing process at the utmost, new steps are not needed, and it is only necessary to change the pattern of the mask plate for forming the common electrode 3 slightly.

Providing the pin contacting structure 4 has following advantages: as the pin contacting structure 4 is bigger than the opening 21 in the insulating layer 2, and the pin contacting structure 4 may go beyond the insulating layer 2, in one hand, the test pin 5 may easily come into contact with the pin contacting structure 4, and on the other hand, the position of the opening 21 may be selected easily, for example, the opening 21 may be provided at a position A overlapping with the pixel electrode 1, and the pin contacting structure 4 may extend to a position B outside the pixel electrode 1, so that the test pin 5 may come into contact with the pin contacting structure 4 at the position B outside the pixel electrode 1.

Preferably, the pixel unit may comprise a light-outputting region for displaying and a light-blocking region at the periphery of the light-outputting region, and wherein the pin contacting structure 4 is located at the light-blocking region.

In each pixel unit, the region of the common electrode 3 which overlaps with the pixel electrode 1 and has slits may drive the liquid crystal so as to achieve display, and this region for displaying is referred to as the light-outputting region. However, at the peripheral periphery of the light-outputting region, there are regions provided with data lines 81, gate lines 82, and other structures such as the thin film transistor, these regions can not accurately drive the liquid crystal and thus are needed to be blocked by black matrixes on the color filter substrate after a display panel is formed, therefore, these regions are called light-blocking regions.

Obviously, the configuration of the above pin contacting structure 4 is different from that of a normal driving structure at the light-outputting region, thus it cannot accurately drive the liquid crystal. In order to avoid influence on display, the pin contacting structure 4 is preferably provided at the light-blocking region not used to display (of course, as the pin contacting structure 4 covers the opening 21, the opening 21 is certainly located at the light-blocking region).

Nevertheless, the pin contacting structure 4 certainly affect normal display (for example, changes in shapes of the light-outputting region and the light-blocking region are needed, or an undesired electric field may be generated between the edges of the pin contacting structure 4 and the common electrode 3), therefore, as above, it is preferable to only select a few pixel units to function as the test pixel units in the entire array substrate.

Figure 7:
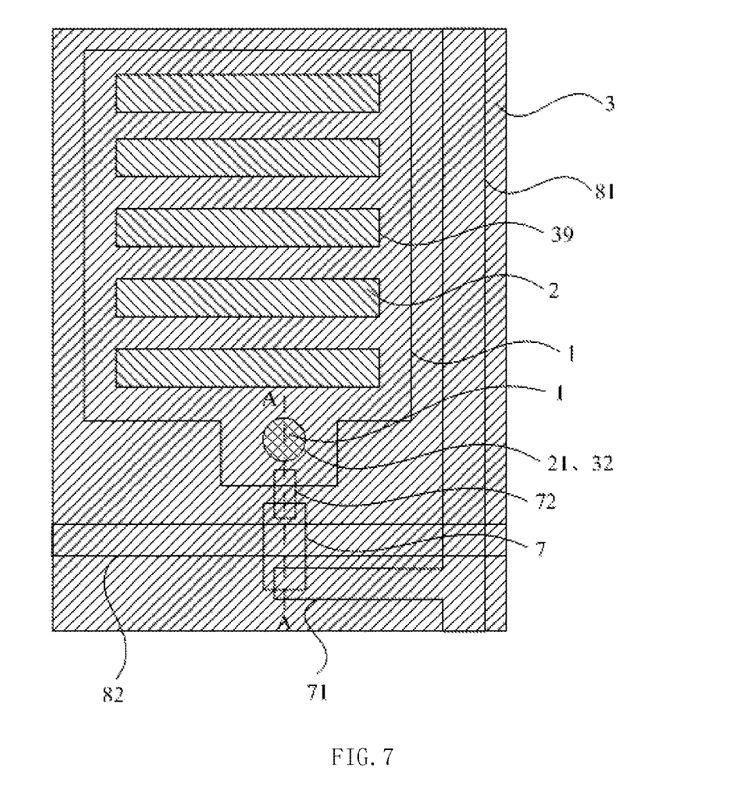
FIG. 7 is a perspective diagram illustrating a top view of a structure of a test pixel unit of an array substrate according to another embodiment in the invention.
Figure 8:
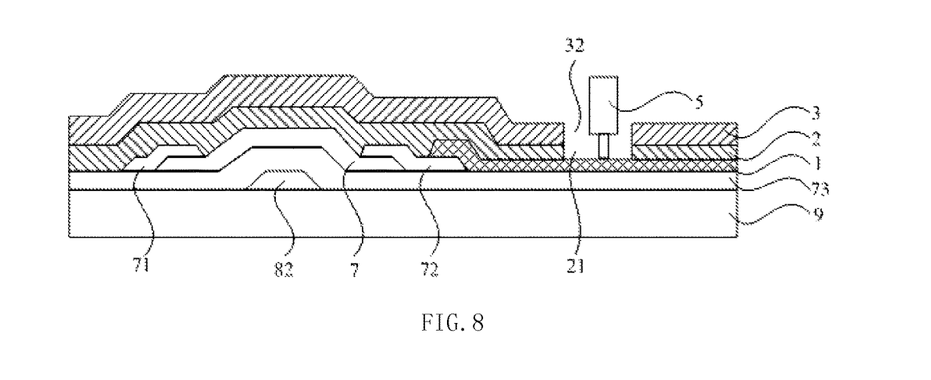
FIG. 8 is a cross-sectional view of the pixel unit in FIG. 7 taken along line AA, wherein the "a perspective diagram illustrating a top view of a structure (FIG. 1, FIG. 5, and FIG. 7)" means that, in the top view, only section lines of the topmost layer at various regions of the structure are drawn, but the structure at various regions is also considered to be transparent, and thus a lower layer may be seen through an upper structure.

Third Embodiment:

As shown in FIG. 7 and FIG. 8, the embodiment provides an array substrate, the structure of which is similar to that of the array substrate in the second embodiment, difference therebetween is in that: in the test pixel unit in the array substrate in the present embodiment, no pin contacting structure is formed, and only the opening 21 in the insulating layer is formed.

It can be seen that, in the test pixel unit in the array substrate in the present embodiment, there is also the opening 21 above the pixel electrode 1 in the insulating layer 2, and the opening 21 is not in contact with the common electrode 3 as well, but difference is in that the opening 21 is not covered by the pin contacting structure.

That is to say, the pixel electrode 1 at the opening 21 is directly exposed (because the insulating layer 2 and the common electrode 3 are not provided at the opening 21), so that test can be performed by using the test pin 5 to come into contact with the pixel electrode 1 through the opening 21.

Obviously, like the second embodiment, the opening 21 is also preferably located at the light-blocking region so as to reduce influence on the normal display.

Specifically, as shown in FIG. 7 and FIG. 8, as an implementation of the present embodiment, the common electrode 3 is provided with a common opening 32 therein, and the common opening 32 coincides with the opening 21 in the insulating layer 2 or goes beyond the opening 21 in the insulating layer 2.

That is to say, at the opening 21, the common opening 32 may be also provided in the common electrode 3, and the common opening 32 may be the same as or larger than the opening 21 in size, and thus the opening 21 is certainly provided in the common opening 32, so that the common electrode 3 can be separated from the opening 21.

Of course, the array substrate in the invention is not limited thereto, so long as some pixel units are each provided therein with an opening which is above the pixel electrode and separated from the common electrode. For example, the common electrode itself has "slits", therefore, the opening in the insulating layer may be provided at the slits, that is, the test pin may come into contact with the pixel electrode through the slits and the opening. The above solution is not preferable because, on one hand, the slit is small so that it is hard for the test pin to accurately pass through the slit, and on the other hand, in the above manner, there is no insulating layer at the slit (there is an insulating layer at the slit in the related art), which may lead to a different electric field at a corresponding region from the related art, so that display may be impacted.

Fourth Embodiment:

The present embodiment provides a display panel comprising the above array substrate.

Of course, the display panel also comprises other known structures, such as a color filter substrate to be aligned with the array substrate, and a liquid crystal layer between the array substrate and the color filter substrate, which will not be described herein.

The embodiment also provides a display device comprising the above display panel.

Of course, the display device also comprises other known structures such as a back-light source, and a power supply, which will not be described herein.

Specifically, the display device in the embodiment may be electronic paper, a phone, a Tablet PC, a television, a display, a notebook PC, a digital photo frame, a navigator, and any other product or member with display function.

It should be understood that the embodiments above are just exemplary embodiments of the present invention to describe the principle of the present invention, and the present invention is not limited thereto. Any person skilled in the art can make various changes and substitutions without departing from the spirit and substance of the present invention, which should be considered to be within the protection scope of the present invention.

The invention claimed is:

1. An array substrate comprising a plurality of pixel units, each of which comprises a thin film transistor, a pixel electrode, an insulating layer above the pixel electrode, and a common electrode above the insulating layer, wherein a drain of the thin film transistor is connected to the pixel electrode, and wherein at least one of the pixel units is a test pixel unit, wherein an opening is provided in the insulating layer of the test pixel unit to be above the pixel electrode and separated from the common electrode; and a common opening is provided in the common electrode, so that the common electrode is exposed from the opening, and the common opening coincides with the opening in the insulating layer.

2. The array substrate of claim 1, wherein the test pixel unit comprises:

a pin contacting structure above the insulating layer, which is conductive and separated from the common electrode, wherein the pin contacting structure is connected to the pixel electrode through the opening in the insulating layer.

3. The array substrate of claim 2, wherein
the pin contacting structure and the common electrode are formed simultaneously.

4. The array substrate of claim 2, wherein
the pixel unit comprises a light-outputting region for displaying and a light-blocking region at the periphery of the light-outputting region, and
the pin contacting structure is located at the light-blocking region.

5. The array substrate of claim 1, wherein
the pixel unit comprises a light-outputting region for displaying and a light-blocking region at the periphery of the light-outputting region, and
the opening in the insulating layer is located at the light-blocking region.

6. The array substrate of claim 1, wherein
the number of the test pixel units is more than one, and
the test pixel units are uniformly distributed on the array substrate.

7. The array substrate of claim 6, wherein
the number of the test pixel units is from 2 to 20.

8. A display panel comprising an array substrate, the array substrate comprises a plurality of pixel units, each of which comprises a thin film transistor, a pixel electrode, an insulating layer above the pixel electrode, and a common electrode above the insulating layer, wherein a drain of the thin film transistor is connected to the pixel electrode, and wherein at least one of the pixel units is a test pixel unit, wherein an opening is provided in the insulating layer of the test pixel unit to be above the pixel electrode and separated from the common electrode; and a common opening is provided in the common electrode, so that the common electrode is exposed from the opening and the common opening coincides with the opening in the insulating layer.

9. The display panel of claim 8, wherein the test pixel unit comprises:

a pin contacting structure above the insulating layer, which is conductive and separated from the common electrode, wherein the pin contacting structure is connected to the pixel electrode through the opening in the insulating layer.

10. The display panel of claim 9, wherein
the pin contacting structure and the common electrode are formed simultaneously.

11. The display panel of claim 9, wherein
the pixel unit comprises a light-outputting region for displaying and a light-blocking region at the periphery of the light-outputting region, and
the pin contacting structure is located at the light-blocking region.

12. The display panel of claim 8, wherein
the pixel unit comprises a light-outputting region for displaying and a light-blocking region at the periphery of the light-outputting region, and
the pin contacting structure is located at the light-blocking region.

13. A display device comprising the display panel of claim 8.

14. The display device of claim 13, wherein the test pixel unit comprises:

a pin contacting structure above the insulating layer, which is conductive and separated from the common electrode, wherein the pin contacting structure is connected to the pixel electrode through the opening in the insulating layer.

15. The display device of claim 14, wherein
the pin contacting structure and the common electrode are formed simultaneously.

16. The display device of claim 14, wherein
the pixel unit comprises a light-outputting region for displaying and a light-blocking region at the periphery of the light-outputting region, and
the pin contacting structure is located at the light-blocking region.

17. The display device of claim 13, wherein
the pixel unit comprises a light-outputting region for displaying and a light-blocking region at the periphery of the light-outputting region, and
the opening in the insulating layer is located at the light-blocking region.

* * * * *